(12) United States Patent
Hirose et al.

(10) Patent No.: US 7,054,744 B2
(45) Date of Patent: May 30, 2006

(54) ROUTE PROVISION APPARATUS, ROUTE PROVISION METHOD, NAVIGATION SYSTEM, AND COMPUTER PROGRAM FOR ROUTE PROVISION APPARATUS OR NAVIGATION SYSTEM

(75) Inventors: Chihiro Hirose, Saitama (JP); Ippei Nambata, Saitama (JP); Kenichiro Yano, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1 day.

(21) Appl. No.: 10/689,736

(22) Filed: Oct. 22, 2003

(65) Prior Publication Data

US 2004/0083055 A1     Apr. 29, 2004

(30) Foreign Application Priority Data

Oct. 23, 2002 (JP) ............................ P2002-308862

(51) Int. Cl.
*G01C 21/34*     (2006.01)

(52) U.S. Cl. .................. 701/210; 701/211; 340/995.19

(58) Field of Classification Search ................ 701/209, 701/210, 211; 340/995.19, 995.21
See application file for complete search history.

(56) References Cited

U.S. PATENT DOCUMENTS

| | | | | |
|---|---|---|---|---|
| 5,652,706 A | * | 7/1997 | Morimoto et al. | 701/210 |
| 5,659,476 A | * | 8/1997 | LeFebvre et al. | 701/201 |
| 5,757,289 A | * | 5/1998 | Nimura et al. | 340/995.21 |
| 5,902,349 A | * | 5/1999 | Endo et al. | 701/202 |
| 5,911,775 A | * | 6/1999 | Tanimoto | 701/210 |
| 6,026,346 A | * | 2/2000 | Ohashi et al. | 701/210 |
| 6,064,941 A | * | 5/2000 | Nimura et al. | 701/210 |
| 6,278,942 B1 | * | 8/2001 | McDonough | 701/210 |
| 6,456,934 B1 | * | 9/2002 | Matsunaga et al. | 701/210 |
| 2001/0029429 A1 | * | 10/2001 | Katayama et al. | 701/209 |

FOREIGN PATENT DOCUMENTS

JP     9-297032 A     11/1997

* cited by examiner

*Primary Examiner*—Michael J. Zanelli
(74) *Attorney, Agent, or Firm*—Sughrue Mion, PLLC

(57) ABSTRACT

A route provision apparatus includes: a veering detecting unit for employing the current positioning data obtained by a position acquisition unit and route data for an originally determined travel route to detect whether a vehicle has veered away from a determined travel route; and a travel route determination unit for determining a new travel route when the vehicle has veered away from the determined travel route, wherein the travel route determination unit employs the detection results obtained by the veering detecting unit 62 to determine a new travel route in accordance with one or more of route determination conditions.

18 Claims, 2 Drawing Sheets

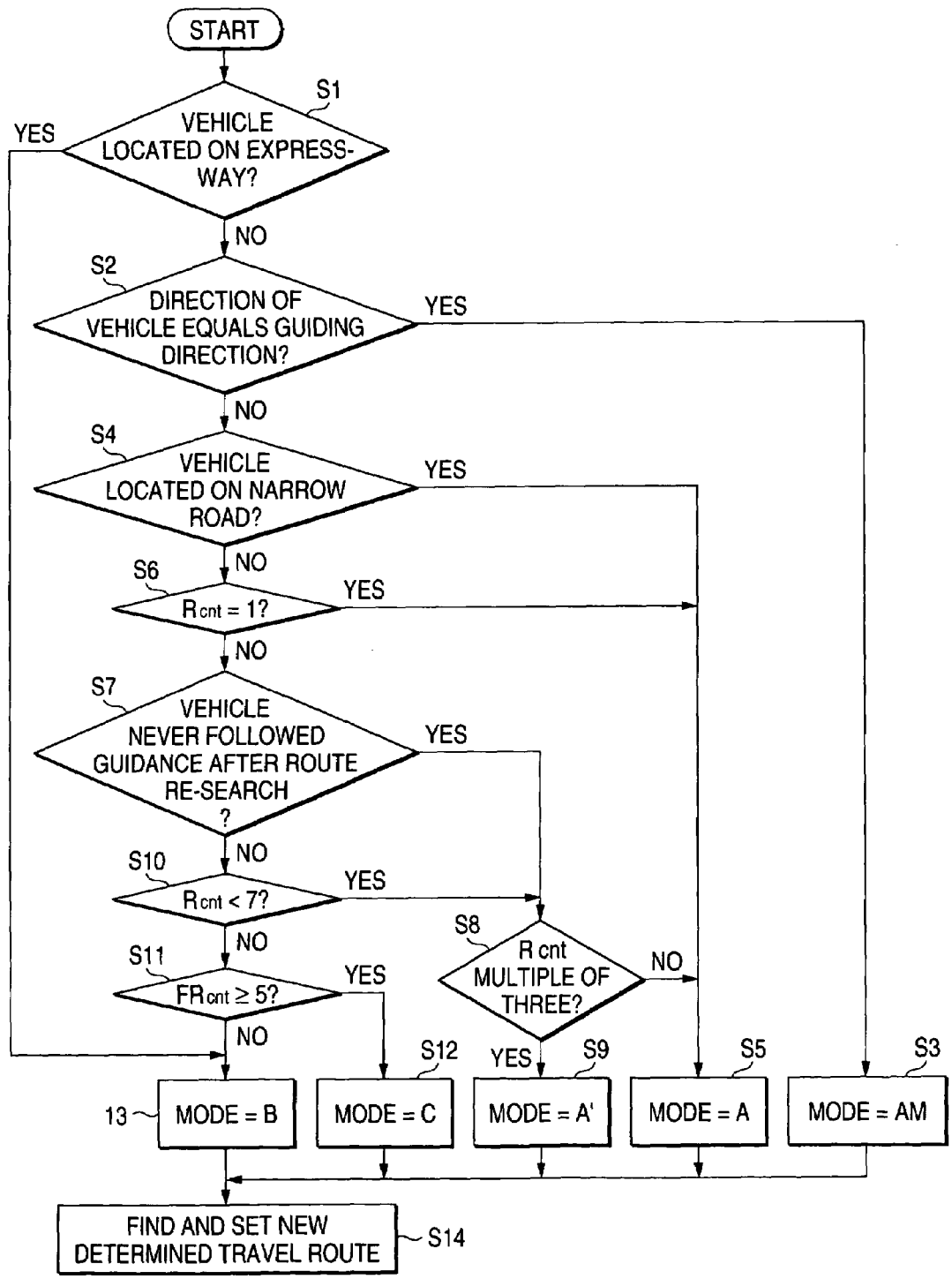

ROUTE PROVISION APPARATUS, ROUTE PROVISION METHOD, NAVIGATION SYSTEM, AND COMPUTER PROGRAM FOR ROUTE PROVISION APPARATUS OR NAVIGATION SYSTEM

The present disclosure relates to the subject matter contained in Japanese Patent Application No. 2002-308862 filed on Oct. 23, 2002, which is incorporated herein by reference in its entirety.

BACKGROUND OF THE INVENTION

1. Field of the Invention

The present invention relates to a route provision apparatus, a route provision method, a navigation system, and a computer program for a computer to function as either the route provision apparatus or the navigation system.

2. Description of the Related Art

A representative mobile object for supporting various activities engaged in by a person is a vehicle, such as an automobile. And to support an operation (driving) of such a vehicle, a vehicular mounted navigation system has been developed.

According to a conventional navigation system, after a departure point and a destination point have been designated, a CPU or a map database installed in the navigation system performs a search for a route to travel to the destination, and the route and a map are displayed on a display device. Since both the route and the map are displayed, a driver can travel to the destination point without becoming lost, even when moving through an unfamiliar area.

Actually, however, once travel has begun, the route provided by a navigation system is not always followed, for a driver may veer off course and travel along a different highway. In the above case, the continued, unchanged display of the original route may not help the driver.

Therefore, a navigation system has been proposed whereby, when a vehicle veers off a route to travel and enters a different road, a search for a new route to the destination point is made from a location near the point whereat the vehicle left the original route, and the new route and a map are displayed on the display device of the navigation system (see JP-A-09-297032 (specifically on Page 5 and FIG. 2)).

SUMMARY OF THE INVENTION

It is therefore one objective of the present invention to provide a route provision apparatus whereby, when a mobile object, a vehicle, leaves a determined travel route, a new, more appropriate route can be determined while taking into account the current operating condition of the vehicle.

In order to achieve the object, according to a first aspect of the invention, there is provided a route provision apparatus including: a position acquisition unit configured to obtain current positioning data including information of a current position of a mobile object; a veering detecting unit configured to employ the current positioning data to detect a veering of the mobile object from a determined travel route; and a travel route determination unit configured to determine a new travel route when the veering detecting unit detects the veering of the mobile object, wherein the travel route determination unit employs the detection result obtained by the veering detecting unit to determine a new travel route based on one or more of route determination conditions.

According to a second aspect of the invention, there is provided a navigation system including: a position acquisition unit configured to obtain current positioning data including information of a current position of a mobile object; a veering detecting unit configured to employ the current positioning data to detect a veering of the mobile object from a determined travel route; a travel route determination unit configured to determine a new travel route when the veering detecting unit detects the veering of the mobile object; and a display device configured to display the determined travel route, wherein the travel route determination unit employs the detection result obtained by the veering detecting unit to determine a new travel route based on one or more of route determination conditions.

According to a third aspect of the invention, there is provided a route provision method including: obtaining current positioning data including information of a mobile object; employing the current positioning data to detect a veering of the mobile object from a determined travel route; and determining a new travel route when the veering of the mobile object from the determined travel route is detected, wherein in the determining of the new travel route, the detection result obtained at the detecting of the veering are employed to determine a new travel route based on one or more of route determination conditions.

According to a fourth aspect of the invention, there is provided a computer program product for causing a computer to execute procedures, including: means for obtaining current positioning data including information of a mobile object; means for employing the current positioning data to detect a veering of the mobile object from a determined travel route; and means for determining a new travel route when the veering of the mobile object from the determined travel route is detected, wherein the means for determining of the new travel route employs the detection result obtained at the detecting of the veering to determine a new travel route based on one or more of route determination conditions.

BRIEF DESCRIPTION OF THE DRAWINGS

The above objects and advantages of the present invention will become more apparent by describing in detail a preferred exemplary embodiment thereof with reference to the accompanying drawings, wherein:

FIG. 2 is a flowchart showing the processing performed for an example according to the present invention.

DETAILED DESCRIPTION OF THE PREFERRED EMBODIMENTS

Figure 1:
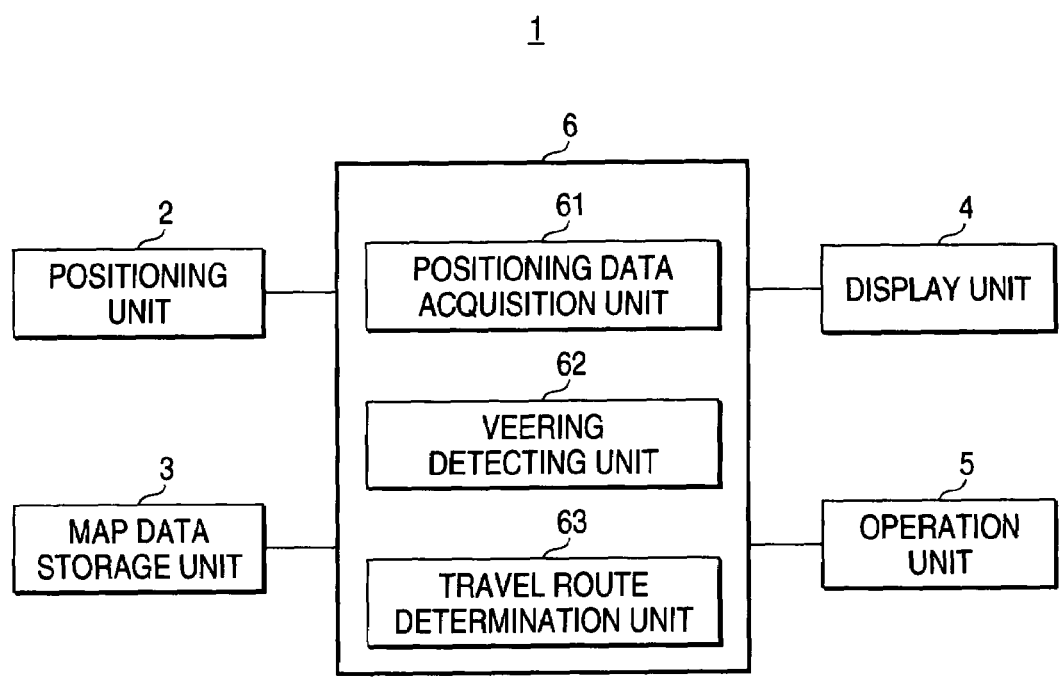
FIG. 1 is a block diagram showing one embodiment of the present invention.

A preferred embodiment of the invention will be described below with reference to the accompanying drawings.

One embodiment of the present invention will now be described while referring to FIG. 1. For this embodiment, a route provision apparatus is adopted as a navigation system.

In FIG. 1, a navigation system 1 includes: a positioning unit 2 that obtains positioning data for the current location of a vehicle; a map data storage unit 3 in which road information and facility data are stored; a display unit 4, for displaying various data; an operation unit, manipulated by the user of the navigation system 1, for instructing the performance of various operations; and a controller 6, which serves as a veering detecting unit and a travel route determination unit.

The positioning unit 2 includes a GPS positioning section, which includes a GPS antenna and a GPS receiver, and a self-supporting positioning section, which includes a vehicular velocity pulse detector and a gyro sensor. The positioning unit 2 determines the current location of a mobile object (such as a vehicle) on which the navigation system 1 is mounted, and outputs the obtained current positioning data.

The map data storage unit 3, which is a data recording disk such as a CD-ROM disk, a DVD-ROM disk or a hard disk, is a well known map data storage unit in which are stored road information for defining the shapes, locations and types of roads, facility data for defining the shapes, locations and types of facilities, and various other data for defining the shapes, locations and types of the flat land and the rivers that constitute the area included in the map.

The display unit 4 includes a display device such as a LCD (liquid crystal display) device or a CRT display device, and displays various data, such as a map, a current position mark for a vehicle and a data menu used to search for point data or facility data.

The operation unit 5 includes an input device such as a remote controller or a touch panel provided on the front of the display unit 4, and used by a user to enter instructions for the navigation system 1.

The controller 6, includes a CPU and memory devices such as a RAM and a ROM, and controls the navigation system 1. The controller 6 also serves as a position acquisition unit 61, a veering detecting unit 62 and a travel route determination unit 63 in accordance with a control program stored in the ROM.

The position acquisition unit 61 obtains, from the positioning unit 2, current positioning data that include latitude data, longitude data and altitude data.

The veering detecting unit 62 compares the current positioning data output by the positioning unit 21 with the travel route data, and determines whether the vehicle has veered off the previously set travel route. Further, the veering detecting unit 62 can also detect conditions existing when the vehicle has veered, the conditions such as how the vehicle had veered off the travel route or how many times the vehicle had veered.

The travel route determination unit 63 searches for a route connecting the departure point and the destination point. The departure point is a point specified by referring to point data (includes latitude, longitude and altitude data) or current positioning data (includes latitude, longitude and altitude data) that are obtained by referring to the position acquisition unit 61, whereat the current vehicle location, obtained by the positioning unit 2, is stored. The destination point is a point specified by referring to the point data (includes latitude, longitude and altitude data) for the location the user designated while employing the operation unit 5.

Based on these point data, and road information stored in the map storage unit 3, the travel route determination unit 63, in accordance with multiple determination conditions, performs an automatic search to determine a travel route from the departure point to the destination. The map storage unit 3 is equipped with a plurality of determination conditions that used in automatically determining the travel route.

When the vehicle has veered off the determined travel route, the travel route determination unit 63 immediately starts a search process, and provides a newly determined travel route. In the search process, in accordance with the veering state detected by the veering detecting unit 62, the travel route determination unit 63 selects one or more determination conditions, and automatically searches for a new route based on the selected determination conditions.

Road information includes link data and node data, and these data have the same forms as those of conventional road information. The travel route determination unit 63 especially employs linking costs included in the link data when searching for and determining a new travel route.

The linking costs are numerical indicators provided in advance in accordance with road types, and roads having high linking costs tend to be avoided when determining a travel route.

In the navigation system 1 of the embodiment, the position acquisition unit 61 obtains, from the positioning unit 2, the current positioning data for the vehicle, and the veering detecting unit 62 employs the current positioning data to determine whether the vehicle has veered away from the determined travel route. Then, based on the veering condition (how the vehicle veered away from the travel route) detected by the veering detecting unit 62, the travel route determination unit 63 selects the route determination conditions to use to determine a new travel route.

Through the above processing, a newly determining running route, the most appropriate one for the vehicular traveling condition, can be determined, so as to provide more support for a driver.

An example for the embodiment will now be described in detail while referring to FIG. 2.

FIG. 2 is a flowchart showing the processing, performed when the veering detecting unit 62 determines that the vehicle has veered away from a determined travel route, in which the travel route determination unit 63 searches for and determines a new travel route.

First, an explanation will be given for the types of the multiple route determination conditions.

<Route Determination Condition 1: Return Route Search>

The route determination condition defined by "return route search" is a condition under which a search is made for a new travel route a vehicle that veered away from the original, determined travel route can follow to easily return to the first route.

Under the "return route search" condition, a process is performed for reducing the numerical value of the linking cost for a road that is used for a determined travel route, so that the travel route from which the vehicle veered can be easily reset as a new travel route.

Furthermore, under the "return route search" condition, up to the destination, from a specific point along the originally determined travel route from which the vehicle veered, the data for the travel route are continuously employed, and another travel route from the point whereat the vehicle veered away to the specific point is searched for and is determined.

Therefore, the only process required is one to search for a new travel route that extends only to a specific point along the originally determined travel route. Therefore, compared with when a search is made to determine a new travel route from the point whereat the vehicle veered away from the determined travel route to the destination, the processing time can be reduced.

<Route Determination Condition 2: All Route Searches 1, 2 and 3>

The route determination conditions defined as "all route search 1", "all route search 2" and "all route search 3" are those for searching for a new travel route to a destination from a point whereat a vehicle has swerved away from the original, determined travel route.

Under the "all route search 1" condition, the numerical value is reduced for the linking cost for a road that is used for a determined travel route, so that the original, determined travel route can be easily reset as a new travel route.

Under the "all route search 2" condition, the linking cost change process is not performed, and a new travel route, optimal for the current time, is searched for and determined.

Under the "all route search 3" condition, the numerical value is increased for the linking cost for the road that was originally used as a determined travel route, so as to avoid the original, determined travel route from being reset as a new route. That is, relative to the determined travel route, a detour route is searched for.

While referring to FIG. 2, an explanation will be given for a process performed by the veering detecting unit 62 to detect the veering state (how the vehicle veered away from the travel route) and the process performed by the travel route determination unit 63 to determine a new travel route based on several of the route determination conditions.

The processing shown in FIG. 2 is initiated when the veering detecting unit 62 compares the current positioning data output by the positioning unit 21 with the travel route data, and determines that the vehicle veered away from the travel route that was originally determined.

When the processing is started, the veering detecting unit 62 employs the current positioning data output by the positioning unit 21 and the road information stored in the map data storage unit 3 to determine whether the vehicle is located on an expressway (or a special automobile road) (step S1).

When the veering detecting unit 62 ascertains at step S1 that the vehicle is located on an expressway (or a special automobile road), the veering detecting unit 62 shifts to step S13, and defines as type B the state wherein the vehicle veered away from the determined travel route. The type B is assumed to be the state wherein the vehicle moved away from an expressway (or a special automobile road) that is designated as a determined travel route to a different expressway (or a different special automobile road) through a junction.

In addition, at step S13, a count value (Rcnt) held by a first counter and a count value (FRcnt) held by a second counter are each incremented by one. It should be noted that these count values are employed for the processing, and are reset when it has been detected that the vehicle has traveled a predetermined distance (e.g., 3 km) along the determined travel route (i.e., when the vehicle has not veered away from the determined travel route for a predetermined distance).

Program control advances to step S14, and the travel determination unit 63 automatically searches for a new travel route based on the type defined by the veering detecting unit 62. The search performed when the type B is defined will now be explained.

When the type B is defined, the travel route determination unit 63 selects the "all route search 2" condition. That is, the travel route determination unit 63 does not perform the linking cost change process, and employs the current positioning data and the destination positioning data to search for and determine a new optimal, current travel route.

When the veering detecting unit 62 ascertains at step S1 that the vehicle is not located on an expressway (or on a freeway), the veering detecting unit 62 advances to step S2, and compares the direction of the vehicle (the forward direction) with a guiding direction. The guiding direction is a direction set based on the determined travel route and corresponds to an approaching direction of the vehicle approaching towards the guiding point (e.g., an intersection) or to a forwarding direction (outgoing direction) of the vehicle that the vehicle should move beyond the guiding point. In the present example, the outgoing direction is employed as the guiding direction to be compared with the direction the vehicle is moving.

When the veering detecting unit 62 ascertains at step S2 that the direction of the vehicle is almost equal to the guiding direction (e.g., the difference in the angle between the two directions is within 45 degrees), the veering detecting unit 62 shifts to step S3 and defines as type AM the state wherein the vehicle veered away from the determined travel route. The AM type is assumed to be the state wherein the vehicle erroneously entered a road near the determined road along which the vehicle should have traveled.

Further, at step S3, the count value (Rcnt) of the first counter is incremented by one.

Sequentially, at step S14, the travel route determination unit 63 automatically searches for a new travel route based on the type defined by the veering detecting unit 62. The search performed when the AM type is defined will now be explained.

When the AM type is defined, the travel route determination unit 63 selects the "return route search" condition as the determination condition. In this case, the numerical value is reduced for the linking cost for a road that was previously set as a determined travel route, so that a environment is provided wherein the determined travel route, from which the vehicle veered away, can be easily designated as a new travel route. In this state, the travel route determination unit 63 searches for and determines a new travel route. Thus, even when the vehicle has erroneously veered away from the original travel route (the road that has been determined as a travel route) and has entered a nearby road, a route for returning from the wrong road to the original travel road (the road that was originally employed for the travel route) is searched for. Therefore, so long as the driver travels along the new travel route, the vehicle can be quickly returned to the original road (the road determined as a travel route).

When the veering detecting unit 62 ascertains at step S2 that the direction traveled by the vehicle is not equal to the guiding direction (e.g., the angular difference between the two directions is greater than 45 degrees), the veering detecting unit 62 shifts to step S4 and employs the current positioning data output by the positioning unit 21 and the road information stored in the map road storage unit 3 to determine whether the vehicle is located on a narrow road.

When the veering detecting unit 62 ascertains at step S4 that the vehicle is located on a narrow road, at step S5, the veering detecting unit 62 defines as type A the state wherein the vehicle veered away from the determined travel route. This type A represents the state wherein it is predicted that the vehicle that veered away from the road included in the original, determined travel route and entered a nearby road will again return to the original road.

When program control is shifted to step S5, the count value (Rcnt) of the first counter is also incremented by one.

Next, at step S14, the travel route determination unit 63 automatically searches for a new travel route based on the type defined by the veering detecting unit 62. The search performed when the type A is defined will now be described.

When the type A is defined, the travel route determination unit 63 selects the "return route search" condition as the determination condition. In this case, the numerical value is reduced for the linking cost for a road that was originally determined as a travel route, so that an environment is provided wherein the original travel route, from which the vehicle veered away, is easily redesignated as a new travel route. In this state, the travel route determination unit 63 searches for and determines a new travel route. Therefore, even when the vehicle veered away from the original road (the road originally determined as a travel route) and entered a nearby road, a route for returning from the wrong road to the original road (the road originally determined as a travel route) is also searched for. Therefore, so long as the driver continues to travel along the new travel route, he or she can quickly return to the original road (the road originally determined as a travel route).

When the veering detecting unit 62 ascertains at step S4 that the vehicle is located on a narrow road, at step S6, the veering detecting unit 62 determines whether the count value (Rcnt) for the first counter equals to 1 (Rcnt=1) or not.

When the decision results at step S6 the count value (Rcnt) for the first counter equals to 1, program control is shifted to step S5, and the processing is repeated.

When at step S6 the counter value (Rcnt) for the first counter not equals to 1, at step S7, the travel route determination unit 63 searches for and determines a new travel route, and determines whether, while the vehicle continues to travel, the traveling conditions are such that they have never followed the guidance provided by the new travel route.

For the decision at step S7, the current positioning data for the vehicle and the data for the newly determined travel route are employed to determine whether the vehicle has passed through a guidance point (e.g., a point such as an intersection for which guidance data are output as driving support data) included in the new travel route.

When it is ascertained at step S7 that under the running conditions the guidance provided by the new travel route has been followed at least once, at step S8, a check is performed to determine whether the count value (FRcnt) for the second counter is a value equivalent to a multiple of three.

When it is ascertained at step S8 that the count value (FRcnt) for the second counter is not a value equivalent to a multiple of three, program control is shifted to step S5 and the processing is repeated.

When it is ascertained at step S8 that the count value (Rcnt) for the first counter is a value equivalent to a multiple of three, at step S9, the state wherein the vehicle veered away from the scheduled travel route is defined as type A'. The type A' represents the state for preventing a repetition of the process wherein the vehicle veers away from the determined travel route and a road to return to the determined travel route is searched for. In the present embodiment, after the return route search has been repeated three times, an all routes search is performed once. It should be noted that the number of repetitions may be arbitrarily set.

When program control is shifted to step S9, the count value (Rcnt) for the first counter is also incremented by one.

Next, program control advances to step S14 and the travel route determination unit 63 automatically searches for a new travel route based on the type defined by the veering detecting unit 62. The search performed when the type A' is defined will now be explained.

When the type A' is defined, the travel route determination unit 63 selects the "all route search 1" condition as the determination condition. In the case, the numerical value is reduced for the linking cost for the road that was originally determined as a travel route, so that an environment is provided wherein the determined travel route from which the vehicle veered away is easily reset as a new travel route. Then, the travel route determination unit 63 searches all the roads from the point whereat the vehicle veered away up to the destination, and determines a new travel route. As a result, when another suitable travel route is found while the road originally determined as a travel route can be easily designated, the new travel route is determined.

When it is ascertained at step S7 that under the traveling conditions the guidance provided by the new travel route has never been followed, at step S10, a check is performed to determine whether the count value (Rcnt) for the first counter is smaller than seven in accordance with the specially determined route setup.

When it is ascertained at step S1 that the count value (Rcnt) for the first counter is smaller than seven, in accordance with the specially determined route setup, at step S8, the processing beginning with step S8 is performed. The specially determined route is a determined travel route, such as one that includes a slight detour, that differs from the normal, shortest travel routes. Through the process, when such a special route has been determined, the vehicle can easily return to the determined route (YES at step S10).

When it is ascertained at step S10 that the counter value (Rcnt) for the first counter is seven or greater, at step S11, a check is performed to determine whether the count value (FRcnt) for the second counter is equal to or greater than five.

When it is ascertained at step S11 that the count value (FRcnt) for the second counter is smaller than five, at step S13, the processing beginning with step S13 is performed. Whereas when it is ascertained that the count value (FRcnt) for the second counter is five or greater, at step S12, the state wherein the vehicle veered away from the determined travel route is defined as type C. The type C represents a state wherein it is assumed that the driver veered away from the determined travel route because he or she did not desire to travel along the determined travel route.

When program control is shifted to step S12, the count value (Rcnt) for the first counter and the count value (FRcnt) for the second counter are each incremented by one.

Next, program control advances to step S14, and the travel route determination unit 63 automatically searches for a new travel route based on the type defined by the veering detecting unit 62. The search performed when the type C is defined will now be described.

When the type C is defined, the travel route determination unit 63 selects the "all route search 3" condition as the determination condition. In this case, the numerical value is increased for the linking cost for a road that was originally determined as a travel route, and an environment is provided wherein the scheduled route from which the vehicle veered away is rarely designated again as a new travel route. Then, from the point whereat the vehicle veered away to the destination, all the roads are examined to select and determines a new travel route. As a result, a road that originally was determined as a travel route is seldom designated, and the probability is higher that another travel route will be selected as a detour. At this time, by reducing the linking cost corresponding to a road extending forward from the road whereat the vehicle is currently located, the road along which the vehicle is currently traveling is searched for and set as a determined travel route.

As is described in detail in the above-described example, the veering detecting unit 62 compares the current positioning data output by the positioning unit 21 with the travel route data. When the veering detecting unit 62 determines that the vehicle has veered away from the determined travel route, the current state of the vehicle that veered away from the route is determined, while taking into account the way the vehicle veered away and the number of times, obtained by the counter, it so veered.

In accordance with the veering state, the travel route determination unit 63 selects one of the route determination conditions, and determines a new travel route based on the selected condition, the current positioning data for the vehicle after swerved, the destination point data and the route data for the original determined travel route, and by employing the process for changing the numerical value of the linking cost.

Specifically, in this example, a navigation system is provided for which a route provision apparatus is mounted that includes: the position acquisition unit 61, for obtaining the current positioning data for the vehicle; and the veering detecting unit 62, for employing the current positioning data to determine whether the vehicle veered away from the original travel route; and the travel route determination unit 63, for determining a new travel route when it is found the vehicle veered away from the determined travel route. The travel route determination unit 63 employs the detection results obtained by the veering detecting unit 62 to determine a new travel route in accordance with one or more route determination conditions.

In accordance with the thus arranged route provision apparatus, when the mobile object has veered away from the determined travel route, the traveling state in the past or the current traveling state can be taken into account to provide a new travel route that is more appropriate than one provided in the conventional case. As a result, more driving support can be provided.

For the above-described embodiment and example, a computer program can be prepared that permits a computer to perform the same functions.

Further, the computer program may be stored in advance on a data recording medium internally provided for the apparatus, or may be stored in the server of a service provider connected to a computer network such as the Internet.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A route provision apparatus comprising:
    a position acquisition unit configured to obtain current positioning data including information of a current position of a mobile object;
    veering detecting unit configured to employ the current positioning data to detect a veering state in which the mobile object has veered from a determined travel route,
    wherein the determined travel route has a destination; and
    a travel route determination unit configured to select a route determination condition from among a plurality of route determination conditions based on the veering state, and to determine a new travel route based on the selected route determination condition, when the veering detecting unit detects the veering of the mobile object,
    wherein the plurality of route determination conditions include:
        a return route search condition for determining the new travel route from the current position to a specific point along the determined travel route;
        a first revised route search condition for determining the new travel route from the current position to the destination; and
        a second revised route search condition for determining the new travel route from the current position to the destination.

2. The route provision apparatus as claimed in claim 1, wherein the first revised route search condition comprises a condition to reduce a numerical value for a linking cost for a road that is used for the determined travel route.

3. The route provision apparatus as claimed in claim 2, wherein the second revised route search condition comprises a condition to increase a numerical value for a linking cost for a road that is used for the determined travel route.

4. The route provision apparatus as claimed in claim 1, wherein the first revised route search condition comprises a condition to increase a numerical value for a linking cost for a road that is used for the determined travel route.

5. The route provision apparatus as claimed in claim 1, wherein the route determination unit selects the return route search condition as the route determination condition when the veering state is a state in which an approaching direction of the mobile object is within a predetermined angle with respect to a guiding direction set based on the determined travel route.

6. The route provision apparatus as claimed in claim 1, wherein the route determination unit selects the return route search condition as the route determination condition when the veering state is a state in which the mobile object is located on a narrow road.

7. The route provision apparatus as claimed in claim 1, wherein the route determination unit selects from between the first revised route determination condition and the second revised route determination condition based on a number of times the mobile object has previously veered from a travel route before the mobile object currently veered from the determined travel route.

8. A navigation system comprising:
    a position acquisition unit configured to obtain current positioning data including information of a current position of a mobile object;
    veering detecting unit configured to employ the current positioning data to detect a veering state in which the mobile object has veered from a determined travel route,
    wherein the determined travel route has a destination; and
    a travel route determination unit configured to select a route determination condition from among a plurality of route determination conditions based on the veering state, and to determine a new travel route based on the selected route determination condition, when the veering detecting unit detects the veering of the mobile object,
    wherein the plurality of route determination conditions include:
        a return route search condition for determining the new travel route from the current position to a specific point along the determined travel route;
        a first revised route search condition for determining the new travel route from the current position to the destination; and
        a second revised route search condition for determining the new travel route from the current position to the destination.

9. A route provision method comprising:
obtaining current positioning data including information of a mobile object;
employing the current positioning data to detect a veering of the mobile object from a determined travel route; and
detecting a veering state in which the mobile object has veered away from the determined travel route;
selecting a route determination condition from among a plurality of route determination conditions when the veering of the mobile object from the determined travel route is detected based on the veering state, the plurality of route determination conditions including:
   a return route search condition for determining a new travel route from the current position to a specific point along the determined travel route;
   a first revised route search condition for determining the new travel route from the current position to the destination; and
   a second revised route search condition for determining the new travel route from the current position to the destination; and
determining the new travel route based on the selected route determination condition.

10. A computer readable medium having a computer program product for causing a computer to execute procedures, comprising:
obtaining current positioning data including information of a mobile object;
employing the current positioning data to detect a veering state in which the mobile object has veered from a determined travel route,
wherein the determined travel route has a destination; and
selecting a route determination condition from among a plurality of route determination conditions based on the veering state, and determining a new travel route based on the selected route determination condition, when the veering of the mobile object from the determined travel route is detected,
wherein the plurality of route determination conditions include:
   a return route search condition for determining the new travel route from the current position to a specific point along the determined travel route;
   a first revised route search condition for determining the new travel route from the current position to the destination; and
   a second revised route search condition for determining the new travel route from the current position to the destination.

11. The computer readable medium as claimed in claim 10 further comprising means for displaying the determined travel route.

12. A navigation apparatus, comprising:
a positioning circuit that outputs positioning data indicating a current position of a mobile object; and
a control circuit that determines when the mobile object veers from a previously determined route,
wherein, when a veering of the mobile object has a first characteristic, the control circuit determines a new travel route from the current position to a specific point along the previously determined route other than a destination of the previously determined route,
wherein, when the veering of the mobile object has a second characteristic, the control circuit determines the new travel route from the current position to the destination based on a first route determination condition; and
wherein, when the veering of the mobile object has a third characteristic, the control circuit determines the new travel route from the current position to the destination based on a second route determination condition.

13. The navigation apparatus as claimed in claim 12, wherein the first route determination condition comprises a condition to reduce a linking cost for a road of the previously determined route.

14. The navigation apparatus as claimed in claim 13, wherein the second route determination condition comprises a condition to increase a linking cost for the road of the previously determined route.

15. The navigation apparatus as claimed in claim 12, wherein the first route determination condition comprises a condition to increase a linking cost for a road of the previously determined route.

16. The navigation apparatus as claimed in claim 12, wherein the second characteristic comprises an angle between a travel direction of the mobile object and a guiding direction corresponding to the previously determined route.

17. The navigation apparatus as claimed in claim 12, wherein the first characteristic comprises the mobile object veering onto a narrow road.

18. The navigation apparatus as claimed in claim 12, wherein the second characteristic corresponds to a number of times the mobile object has previously veered before the mobile object currently veered from the previously determined route.

* * * * *